(12) United States Patent
Agarwal et al.

(10) Patent No.: US 12,204,909 B2
(45) Date of Patent: Jan. 21, 2025

(54) DIRECT SWAP CACHING WITH ZERO LINE OPTIMIZATIONS

(71) Applicant: Microsoft Technology Licensing, LLC, Redmond, WA (US)

(72) Inventors: Ishwar Agarwal, Redmond, WA (US); George Chrysos, Portland, OR (US); Oscar Rosell Martinez, Barcelona (ES); Yevgeniy Bak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/503,869

(22) Filed: Nov. 7, 2023

(65) Prior Publication Data

US 2024/0103876 A1    Mar. 28, 2024

Related U.S. Application Data

(63) Continuation of application No. 17/718,920, filed on Apr. 12, 2022, now Pat. No. 11,847,459.

(51) Int. Cl.
*G06F 12/02* (2006.01)
*G06F 9/38* (2018.01)
*G06F 9/445* (2018.01)
*G06F 9/50* (2006.01)
*G06F 12/0815* (2016.01)

(52) U.S. Cl.
CPC ........ *G06F 9/3816* (2013.01); *G06F 9/44505* (2013.01); *G06F 9/5016* (2013.01); *G06F 9/505* (2013.01); *G06F 12/0815* (2013.01)

(58) Field of Classification Search
CPC ............... G06F 9/3816; G06F 9/44505; G06F 9/5016; G06F 9/505; G06F 12/0815
See application file for complete search history.

(56) References Cited

U.S. PATENT DOCUMENTS

| | | | |
|---|---|---|---|
| 6,460,122 B1 * | 10/2002 | Otterness | G06F 12/0866 711/E12.024 |
| 8,813,052 B2 * | 8/2014 | Gray | G06F 12/0808 717/149 |
| 9,652,686 B2 * | 5/2017 | Sankaranarayanan | G06V 10/457 |
| 11,670,352 B1 * | 6/2023 | Wilkerson | G11C 13/0021 711/104 |

(Continued)

*Primary Examiner* — Cheng Yuan Tseng
(74) *Attorney, Agent, or Firm* — Ranjeev Singh; Singh Law, PLLC

(57) ABSTRACT

Systems and methods related to direct swap caching with zero line optimizations are described. A method for managing a system having a near memory and a far memory comprises receiving a request from a requestor to read a block of data that is either stored in the near memory or the far memory. The method includes analyzing a metadata portion associated with the block of data, the metadata portion comprising: both (1) information concerning whether the near memory contains the block of data or whether the far memory contains the block of data and (2) information concerning whether a data portion associated with the block of data is all zeros. The method further includes instead of retrieving the data portion from the far memory, synthesizing the data portion corresponding to the block of data to generate a synthesized data portion and transmitting the synthesized data portion to the requestor.

20 Claims, 11 Drawing Sheets

(56) References Cited

U.S. PATENT DOCUMENTS

| | | | |
|---|---|---|---|
| 11,847,459 B2* | 12/2023 | Agarwal | G06F 12/0804 |
| 2023/0236985 A1* | 7/2023 | Reed | G06F 12/0895 |
| | | | 711/141 |

* cited by examiner

400

DIRECT SWAP CACHING WITH ZERO LINE OPTIMIZATIONS

CROSS-REFERENCE TO RELATED APPLICATION(S)

This application is a continuation of U.S. patent application Ser. No. 17/718,920, filed on Apr. 12, 2022, entitled "DIRECT SWAP CACHING WITH ZERO LINE OPTIMIZATIONS," the entire contents of which are hereby incorporated herein by reference.

BACKGROUND

Multiple users or tenants may share systems, including computing systems and communications systems. Computing systems may include the public cloud, the private cloud, or a hybrid cloud having both public and private portions. The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Multiple tenants may use compute, storage, and networking resources associated with the servers in the cloud. The compute, storage, and networking resources may be provisioned using a host operating system (OS) installed on a compute node (e.g., a server) in a data center. Each host OS may allow multiple compute entities, such as a virtual machine, to access the compute and memory resources associated with a respective compute node. Because of the uneven usage of memory resources by the compute entities supported by the host OS, the amount of memory resources may not be allocated efficiently. As an example, a large amount of memory may be unutilized by the host servers.

SUMMARY

In one aspect, the present disclosure relates to a method for managing a system having a near memory and a far memory. The method may include receiving a request from a requestor to read a block of data that is either stored in the near memory or the far memory. The method may further include analyzing a metadata portion associated with the block of data, the metadata portion comprising: both (1) a first information related to whether the near memory contains the block of data or whether the far memory contains the block of data and (2) a second information related to whether a data portion associated with the block of data is all zeros. The method may further include in response to determining that the far memory contains the block of data and that a data portion associated with the block of data is all zeros, instead of retrieving the data portion from the far memory, synthesizing the data portion corresponding to the block of data to generate a synthesized data portion and transmitting the synthesized data portion to the requestor.

In another aspect, the present disclosure relates to a system having a near memory and a far memory. The system may include a near memory controller configured to receive a request from a requestor to read a block of data that is either stored in the near memory or the far memory. The system may further include the near memory controller further configured to analyze a metadata portion associated with the block of data, the metadata portion comprising: both (1) a first information related to whether the near memory contains the block of data or whether the far memory contains the block of data and (2) a second information related to whether a data portion associated with the block of data is all zeros. The system may further include the near memory controller further configured to, in response to determining that the far memory contains the block of data and that a data portion associated with the block of data is all zeros, instead of retrieving the data portion from the far memory, synthesize the data portion corresponding to the block of data to generate a synthesized data portion and transmit the synthesized data portion to the requestor.

In a yet another aspect, the present disclosure relates to a method for managing a system having a near memory and a far memory. The method may include receiving a request from a requestor to read a block of data that is either stored in the near memory or the far memory. The method may further include analyzing a metadata portion associated with the block of data, the metadata portion comprising: both (1) a first information related to whether the near memory contains the block of data or whether the far memory contains the block of data and (2) a second information related to whether a data portion associated with the block of data is all zeros.

The method may further include in response to determining that the far memory contains the block of data and that a data portion associated with the block of data is all zeros, instead of retrieving the data portion from the far memory, synthesizing the data portion corresponding to the block of data to generate a synthesized data portion and transmitting the synthesized data portion to the requestor. The method may further include performing a speculative swap by writing a data portion corresponding to a block of data previously stored in the near memory to the far memory and updating a metadata portion stored in the near memory to reflect that the near memory contains a data portion corresponding to the block of data previously stored in the far memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
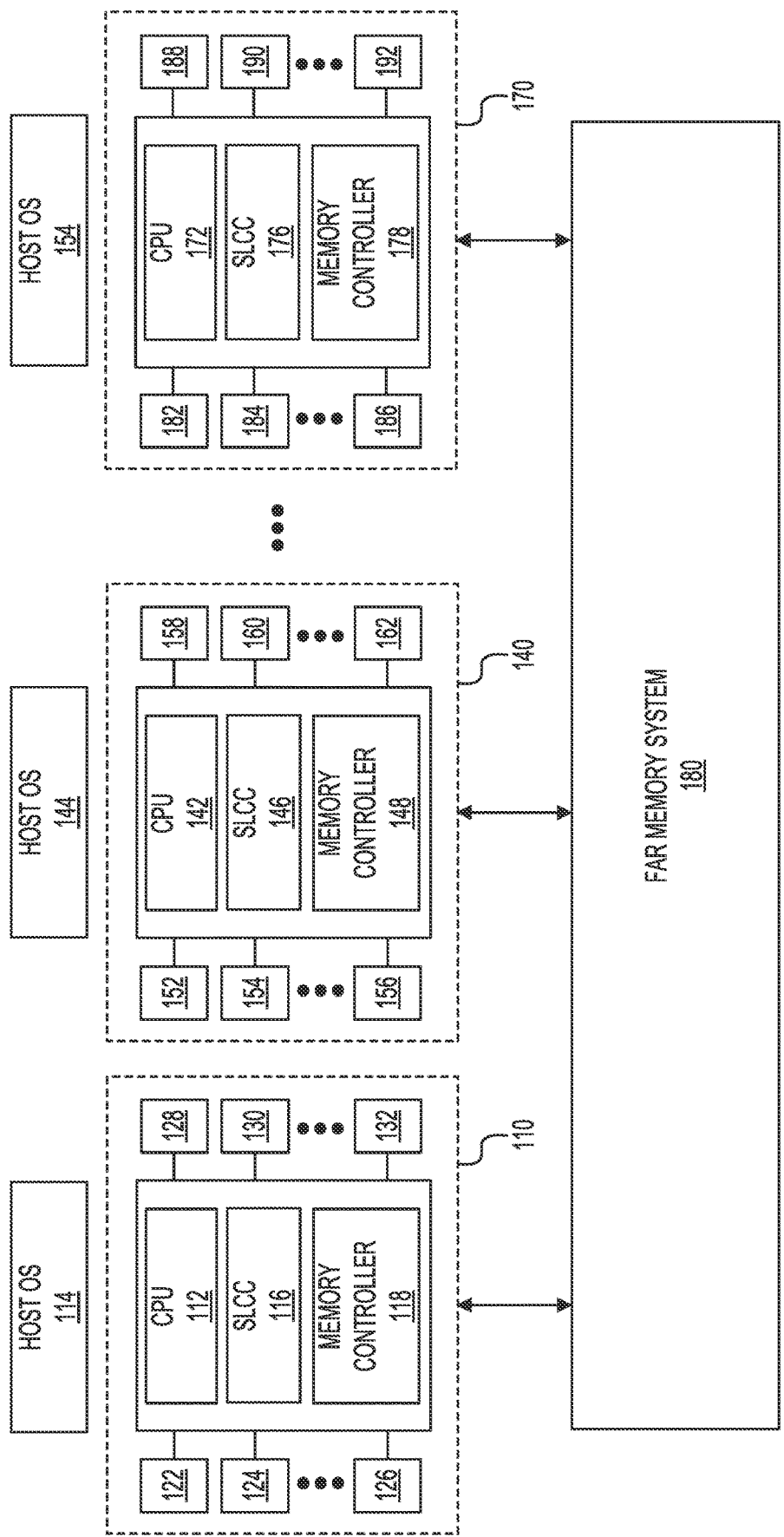
FIG. 1 is a block diagram of a system including compute nodes including access to both near memory and far memory in accordance with one example.

Examples described in this disclosure relate to systems and methods for direct swap caching with zero line optimizations. Certain examples relate to direct swap caching with zero line optimizations for use with a host operating system (OS) in a computing system or a multi-tenant computing system. The multi-tenant computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Compute entities may be executed using compute and memory resources of the data center. As used herein, the term "compute entity" encompasses, but is not limited to, any executable code (in the form of hardware, firmware, software, or in any combination of the foregoing) that implements a functionality, a virtual machine, an application, a service, a micro-service, a container, or a unikernel for serverless computing. Alternatively, compute entities may be executing on hardware associated with an edge-compute device, on-premises servers, or other types of systems, including communications systems, such as base stations (e.g., 5G or 6G base stations).

Consistent with the examples of the present disclosure, a host OS may have access to a combination of near memory (e.g., local DRAM) and far memory (e.g., an allocated portion of a pooled memory). As an example, the compute nodes in a data center may be allocated pooled memory exposed by a pooled memory system, which then may be made accessible to the host OS running on the compute node as far memory. The pooled memory relates to memory that includes any physical memory that is shared by multiple compute nodes. In addition, the data/instructions associated with a host OS may be swapped in and out of the near memory from/to the far memory. In this arrangement, the near memory (e.g., the local memory) may be implemented using expensive memory and the far memory (e.g., the pooled memory) may be implemented using cheaper memory. As an example, the expensive memory may correspond to double data rate (DDR) dynamic random access memory (DRAM) that operates at a higher data rate (e.g., DDR2 DRAM, DDR3 DRAM, DDR4 DRAM, or DDR5 DRAM) and the cheaper memory may correspond to DRAM that operates at a lower data rate (e.g., DRAM or DDR DRAM). Other cost differences may be a function of the reliability or other differences in quality associated with the near memory versus the far memory. As used herein the term "near memory" and "far memory" are to be viewed in relative terms. Thus, near memory includes any memory that is used for storing any data or instructions that is evicted from the system level cache(s) and the far memory includes any memory that is used for storing any data or instruction swapped out from the near memory.

FIG. 1 is a block diagram of a system 100 including compute nodes 110, 140, and 170 coupled with a far memory system 180 in accordance with one example. Each compute node may include compute and memory resources. As an example, compute node 110 may include a central processing unit (CPU) 112; compute node 140 may include a CPU 142; and compute node 170 may include a CPU 172. Although each compute node in FIG. 1 is shown as having a single CPU, each compute node may include additional CPUs, and other devices, such as graphics processor units (GPU)s, field programmable gate arrays (FPGA)s, application specific integrated circuits (ASIC)s, or other devices. In addition, each compute node may include near memory, which may be organized as memory modules. As an example, compute node 110 may include near memory in the form of memory modules 122, 124, 126, 128, 130, and 132. Compute node 140 may include near memory in the form of memory modules 152, 154, 156, 158, 160, and 162. Compute node 170 may include near memory in the form of memory modules 182, 184, 186, 188, 190, and 192. Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as near memory.

With continued reference to FIG. 1, each compute node may further include system level cache controllers (SLCCs) and associated cache memory (e.g., system level cache (not shown)). As an example, compute node 110 may include system level cache controller (SLCC) 116, compute node 140 may include system level cache controller (SLCC) 146, and compute node 170 may include system level cache controller (SLCC) 176. Furthermore, each compute node may further include one or more memory controllers. As an example, compute node 110 may include memory controller 118, compute node 140 may include memory controller 148, and compute node 170 may include memory controller 178. The memory controller included in such nodes may be a double dynamic rate (DDR) DRAM controller in case the memory modules include DDR DRAM.

Each compute node may be configured to execute several compute entities. In this example, compute node 110 may have host OS 114 installed on it; compute node 140 may have host OS 144 installed on it, and compute node 170 may have host OS 174 installed on it. Far memory system 180 may include logical pooled memory, which may include several memory modules. Although not shown in FIG. 1, far memory system 180 may include a logical pooled memory controller (described later). Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as pooled memory.

Any of host OS (e.g., host OS 114, 144, or 174), being executed by any of compute nodes (e.g., compute node 110, 140, or 170), may access at least a portion of the physical memory included as part of far memory system 180. Far memory system 180 may assign a portion of the pooled memory to the compute node when the compute node powers on or as part of allocation/deallocation operations. The assigned portion may include one or more "slices" of memory, where a slice refers to any smallest granularity of portions of memory managed by the pooled memory controller (e.g., a memory page or any other block of memory aligned to a slice size). Any suitable slice size may be used, including 1 GB slices, 2 GB slices, 8 GB slices, or any other suitable slice sizes. The pooled memory controller may assign or revoke assignment of slices to compute nodes based on an assignment/revocation policy associated with far memory system 180. As explained earlier, the data/instructions associated with a host OS may be swapped in and out of the near memory from/to the far memory. In this arrangement, the near memory (e.g., the local memory) may be implemented using expensive memory and the far memory (e.g., the pooled memory) may be implemented using cheaper memory.

In one example, compute nodes 110, 140, and 170 may be part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In one example, each cluster may include several identical compute nodes. Thus, a cluster may include compute nodes including a certain number of CPU cores and a certain amount of memory. Instead of compute nodes, other types of hardware such as edge-compute devices, on-premises servers, or other types of systems, including communications systems, such as base stations (e.g., 5G or 6G base stations) may also be used. Although FIG. 1 shows system 100 as having a certain number of components, including compute nodes and memory components, arranged in a certain manner, system 100 may include additional or fewer components, arranged differently. As an example, far memory system 180 may be included as part of each compute node instead of being a separate system as shown in FIG. 1.

Figure 2:
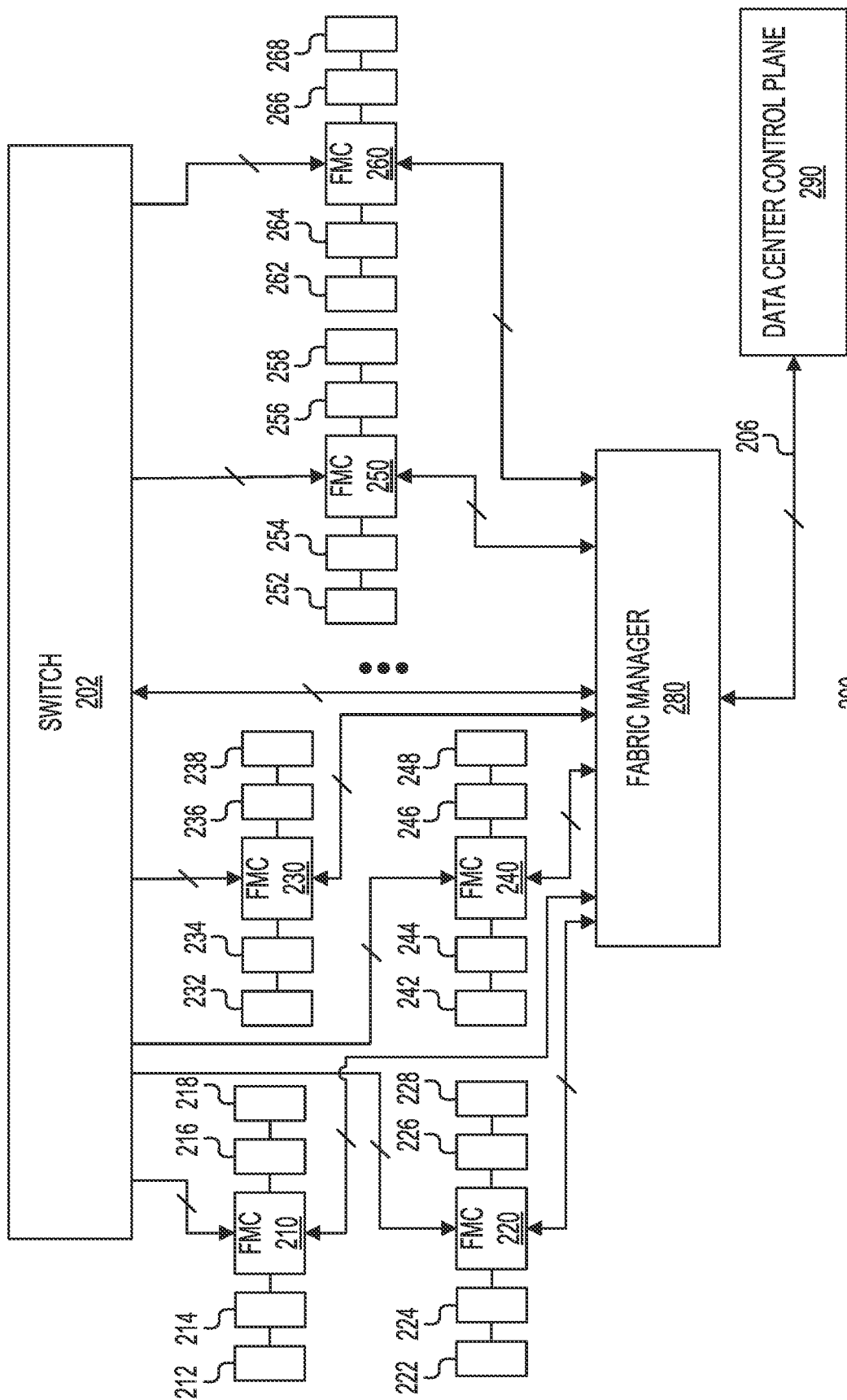
FIG. 2 shows a block diagram of a far memory implemented as a pooled memory system.

FIG. 2 shows a block diagram of an example far memory system 200 corresponding to the far memory system 180 shown in FIG. 1. Far memory system 200 may include a switch 202 for coupling the far memory system controllers to compute nodes (e.g., compute nodes 110, 130, and 150 of FIG. 1). Far memory system 200 may further include several pooled memory controllers and associated pooled memory modules. As an example, far memory system 200 may include far memory controller (FMC) 210, FMC 220, FMC 230, FMC 240, FMC 250, and FMC 260 coupled to switch 202, as shown in FIG. 2. Each of FMC 210, FMC 220, FMC 230, FMC 240, FMC 250, and FMC 260 may further be coupled to fabric manager 280. FMC 210 may further be coupled to memory modules 212, 214, 216, and 218. FMC 220 may further be coupled to memory modules 222, 224, 226, and 228. FMC 230 may further be coupled to memory modules 232, 234, 236, and 238. FMC 240 may further be coupled to memory modules 242, 244, 246, and 248. FMC 250 may further be coupled to memory modules 252, 254, 256, and 258. FMC 260 may further be coupled to memory modules 262, 264, 266, and 268. Each memory module may be a dual-in-line memory module (DIMM) or a single-in-line memory module (SIMM).

With continued reference to FIG. 2, in one example, each of the far memory controllers may be implemented as a Compute Express Link (CXL) specification compliant pooled memory controller. In this example, each of the memory modules associated with far memory system 200 may be configured as Type 3 CXL devices. Fabric manager 280 may communicate via bus 206 with data center control plane 290. In one example, fabric manager 280 may be implemented as a CXL specification compliant fabric manager. Control information received from data center control plane 290 may include control information specifying which slices of memory from the memory pool are allocated to any particular compute node at a given time. In response to this control information, fabric manager 280 may allocate a slice of memory from within the far memory to a specific compute node in a time-division multiplexed fashion. In other words, at a time a particular slice of memory could only be allocated to a specific compute node and not to any other compute nodes. As part of this example, transactions associated with CXL.io protocol, which is a PCIe-based non-coherent I/O protocol, may be used to configure the memory devices and the links between the CPUs and the memory modules included in far memory system 200. The CXL.io protocol may also be used by the CPUs associated with the various compute nodes in device discovery, enumeration, error reporting, and management. Alternatively, any other I/O protocol that supports such configuration transactions may also be used. The memory access to the memory modules may be handled via the transactions associated with CXL.mem protocol, which is a memory access protocol that supports memory transactions. As an example, load instructions and store instructions associated with any of the CPUs may be handled via CXL.mem protocol. Alternatively, any other protocols that allow the translation of the CPU load/store instructions into read/write transactions associated with memory modules included in far memory system 200 may also be used.

Each far memory controller (e.g., any of FMC 210, FMC 220, FMC 230, FMC 240, FMC 250, and FMC 260) may maintain a segment table indicating different portions of the far memory (e.g., implemented as a pooled memory) that may be assigned/un-assigned, at any suitable granularity with regard to portion sizes. More generally, the far memory controller may maintain any suitable table representing available/assigned memory slices, indicating any relevant information pertaining to slices (e.g., assigned/unassigned status, ownership status indicating which compute node an assigned slice is assigned to, recency of use information, recency of assignment information, host type or other metadata pertaining to the compute node the assigned slice is assigned to). For example, for a 2 TB memory pool, portions may be assigned/unassigned at a 1 GB slice granularity, e.g., there may be 2K (e.g., 2048) segments in the segment table indicating different 1 GB slices. As an example, a segment in the segment table may comprise a 32-bit segment identifier that includes 8 bits indicating which host a portion is assigned to, a 1-bit value indicating whether the portion was ever accessed, a 3-bit decoder map indicating a target address decoding scheme for addressing data in the portion, and/or a 16-bit leaky bucket counter indicating a count value of recent accesses to the portion. For example, the segment table described above may comprise an 8 KB region of SRAM of the pooled memory controller. The above-described schema for a segment table is non-limiting, and the segment table may comprise any suitable data for tracking assignment of memory. Although FIG. 2 shows far memory system 200 as having a certain number of components, including pooled memory controllers and memory modules, arranged in a certain manner, far memory system 200 may include additional or fewer components, arranged differently. As an example, switch 202 may not be an integrated part of far memory system 200, and this switch instead, may be a separate component. In addition, multiple switches may be used. Moreover, fabric manager 280 may be shared with additional or fewer pooled memory controllers.

In order to use direct swap caching in the context of system 100 of FIG. 1, the near memory must have a fixed ratio with the far memory. In this example, it is assumed that near memory has the same size as the far memory. This means that any access to a location in the near memory will operate in the direct swap cache manner. Thus, these accesses will first perform a lookup within the memory designated as the near memory. Consistent with a non-optimized direct swapping cache arrangement, any hit in the near memory will be serviced directly out of the near memory (e.g., the local memory), whereas a miss in the near memory will cause a swap operation between the corresponding far memory and near memory locations. Swapping operations (e.g., swapping data from the locations in the far memory into the locations in the near memory or swapping data out from the locations in the near memory into the locations in the far memory) may be performed at a granularity level of a cache line. Thus, in this example the block of data equates to the cache line. However, in this example, each location can have only one of the two cache lines at a given time. The other cache line is present in the far memory.

Each cache line may include a combination of a data portion (e.g., 512 bits) and a metadata portion (e.g., 128 bits). The data portion may contain data representing user data or instructions executed by a compute node. The metadata portion may include data representing various attributes of the data in the data portion. The metadata portion can also include error checking and correction bits or other suitable types of information. In addition, the metadata portion may include a tag having an appropriate number of bit(s) to distinguish between the location of a cache line. Table 1 shows example metadata information that could be used to distinguish the location of two cache lines (e.g., CL $A and CL $B) and to let the near memory controller know whether the current cache line or the other cache line comprises zeros.

TABLE 1

| CURRENT CACHE LINE | OTHER CACHE LINE COMPRISES ZEROS | INTERPRETATION |
|---|---|---|
| 0 | 0 | Current cache line in the near memory is CL $A and the other cache line (e.g., CL $B) comprises zeros. |
| 0 | 1 | Current cache line in the near memory is CL $A and the other cache line (e.g., CL $B) does not comprise zeros. |
| 1 | 0 | Current cache line in the near memory is CL $B and the other cache line (e.g., CL $A) comprises zeros. |

TABLE 1-continued

| CURRENT CACHE LINE | OTHER CACHE LINE COMPRISES ZEROS | INTERPRETATION |
|---|---|---|
| 1 | 1 | Current cache line in the near memory is CL $B and the other cache line (e.g., CL $A) does not comprise zeros. |

The above table assumes a fixed ratio of 1:1 between a swappable range for the near memory and a swappable range for the far memory. The present disclosure, however, is not limited to the use of a fixed ratio of 1:1 between the swappable range for the near memory and the swappable range for the far memory. As an example, a ratio of 1:3 may be used. In such a case, additional tag bits may be required to encode the information concerning the location of the cache line in terms of the region of the memory having the cache line. Furthermore, additional metadata information may be maintained for the SLCC and the memory controller to track the status of the cache lines. Table 2 below shows example metadata information that could be used to accomplish this purpose. The use of the information in Tables 1 and 2 is explained further with the transaction flows shown in FIGS. 3-6.

TABLE 2

| INCLUSIVE BIT | OTHER CACHE LINE COMPRISES ZEROS | INTERPRETATION |
|---|---|---|
| 0 | 0 | The current cache line (e.g., CL $A) is not guaranteed to be in the near memory and the other cache line (e.g., CL $B) is guaranteed to comprise zeros. |
| 0 | 1 | The current cache line (e.g., CL $A) is not guaranteed to be in the near memory and the other cache line (e.g., CL $B) is not guaranteed to comprise zeros. |
| 1 | 0 | The current cache line (e.g., CL $A) is guaranteed to be in the near memory and the other cache line (e.g., CL $B) is guaranteed to comprise zeros. |
| 1 | 1 | The current cache line (e.g., CL $A) is guaranteed to be in the near memory and the other cache line (e.g., CL $B) is not guaranteed comprise zeros. |

Figure 3:
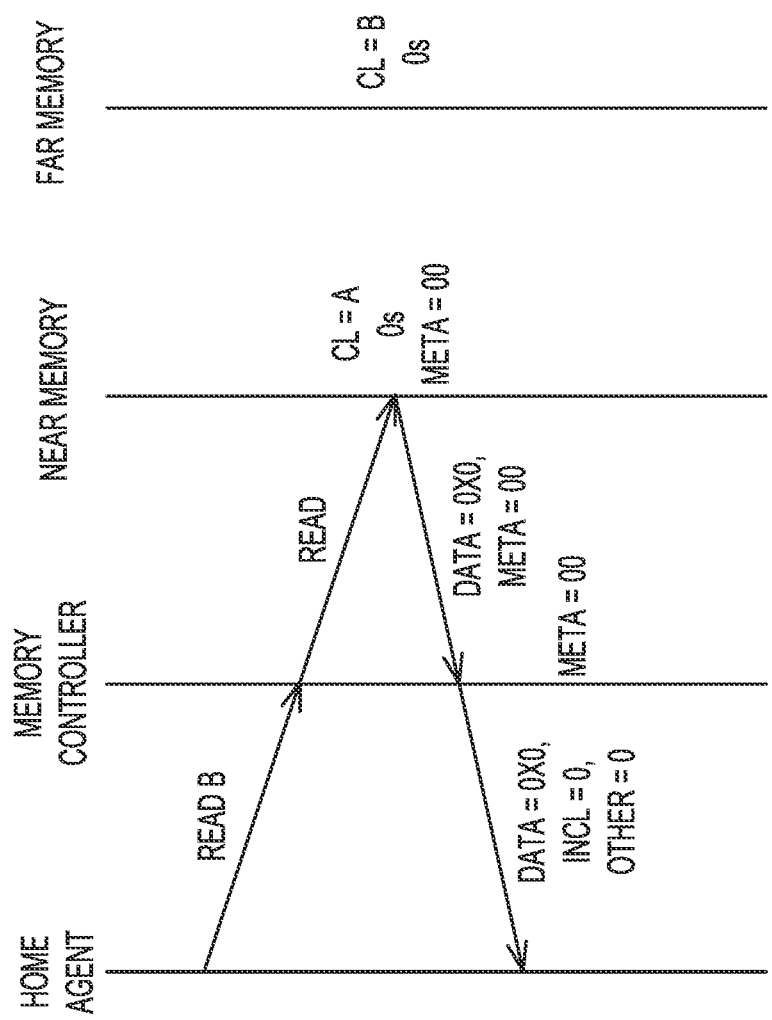
FIG. 3 is a diagram showing a transaction flow related to a read operation in accordance with one example.

FIG. 3 is a diagram showing an example transaction flow 300 related to a read operation. During a read operation, a CPU (e.g., any of CPUs 112, 142, or 172 of FIG. 1) can issue a command that is processed by a home agent associated with a memory controller (e.g., any of memory controllers 118, 148, and 178 of FIG. 1) to read data. In this example, first there is a read request from the home agent to read cache line CL $B. The home agent may be the last level cache controller (e.g., any of SLCC 116, SLCC 146, and SLCC 176 of FIG. 1) or any other controller that controls the coherency for a given cache line. The home agent may ensure that if multiple cores associated with a CPU are requesting access to cache lines, then those requests are processed by the same control logic—e.g., the home agent. The memory controller (e.g., any of the near memory controllers described earlier with respect to FIG. 1) checks the contents of the near memory. The metatag portion in this example is "00" indicating that the near memory contains cache line CL $A resulting in a miss. In this example, the metatag portion further indicates that the other cache line (CL $B) that is in the far memory comprises zeros only. As a result, the inclusive bit (INCL) is indicated as being logical value "0" and the other bit (OTHER) is also indicated as being logical value "0." Notably, in this case, instead of retrieving the cache line CL $B from the far memory, the memory controller synthesizes the data portion corresponding to cache line CL $B to generate a synthesized data portion (all zeros) and transmits the synthesized data portion and the metadata portion to the home agent. Advantageously, as a result, an access to far memory is not required, saving both power and time. In one example, the synthesized data portion (e.g., all zeros) corresponding to the data portion (e.g., 512 bits) may be generated by the near memory controller (e.g., any of memory controllers 118, 148, and 178 of FIG. 1) by taking 512 bits that are grounded, and are thus effectively zeros, and providing those in response to the read operation. Alternatively, the contents of a 512-bit register storing zeros may be provided.

The read operation described with respect to FIG. 3 may be of two types: a load read or a store read. The memory controller may determine the type of the read operation from the semantics associated with the read operation. As in one example, the opcode for the read operations may be different. In case of the load read, the memory controller will not issue a speculative access; however, in case of the store read, the memory controller may issue a speculative access. The speculative access may be a speculative read to the far memory to perform a swap operation between the near memory and the far memory. This may advantageously allow for the CPU during a write back operation to have a hit in the near memory. The speculative swap is further described with respect to FIG. 7.

Figure 4:
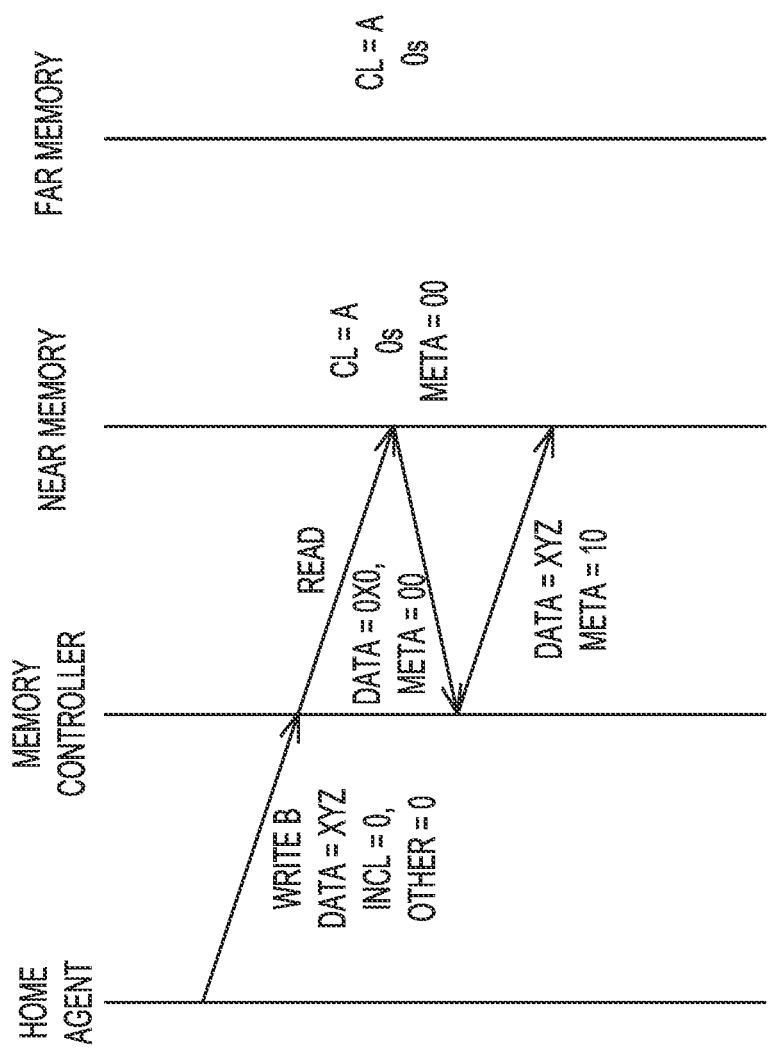
FIG. 4 is a diagram showing a transaction flow related to a write operation in accordance with one example.

FIG. 4 is a diagram showing an example transaction flow 400 related to a write operation. During a write operation, a CPU (e.g., any of CPUs 112, 142, or 172 of FIG. 1) can issue a command that is processed by a home agent associated with a memory controller (e.g., any of memory controllers 118, 148, and 178 of FIG. 1) to write the data. This example relates to the home agent writing cache line $B with XYZ data and is a continuation of the transaction flow shown in FIG. 3. Accordingly, the memory controller communicates to the system level cache controller (SLCC) the status of the inclusive bit (INCL) and the other bit (OTHER) as logical "0." In this example, first there is a read request from the memory controller to read cache line CL $B. Using this read request, the memory controller (e.g., any of the near memory controllers described earlier with respect to FIG. 1) checks the contents of the near memory. The metatag portion in this example is 00, indicating that the near memory contains cache line CL $A, resulting in a miss. The metatag portion, however, further indicates that the other cache line (CL $B) that is in the far memory comprises zeros only. In this case, instead of retrieving the cache line CL $B from the far memory, the memory controller performs an auto-swap operation. The auto-swap operation includes the memory controller writing the XYZ data into the near memory for cache line CL $B and changing the metatag portion from 00 to 10 indicating that the cache line CL $B does not contain all zeros. No change is made with respect to the metatag portion (00) associated with the cache line CL $A since that cache line has all zeros both in the near memory location and the far memory location. Advantageously, as a result, an access to the far memory is not required, saving both power and time.

Figure 5:
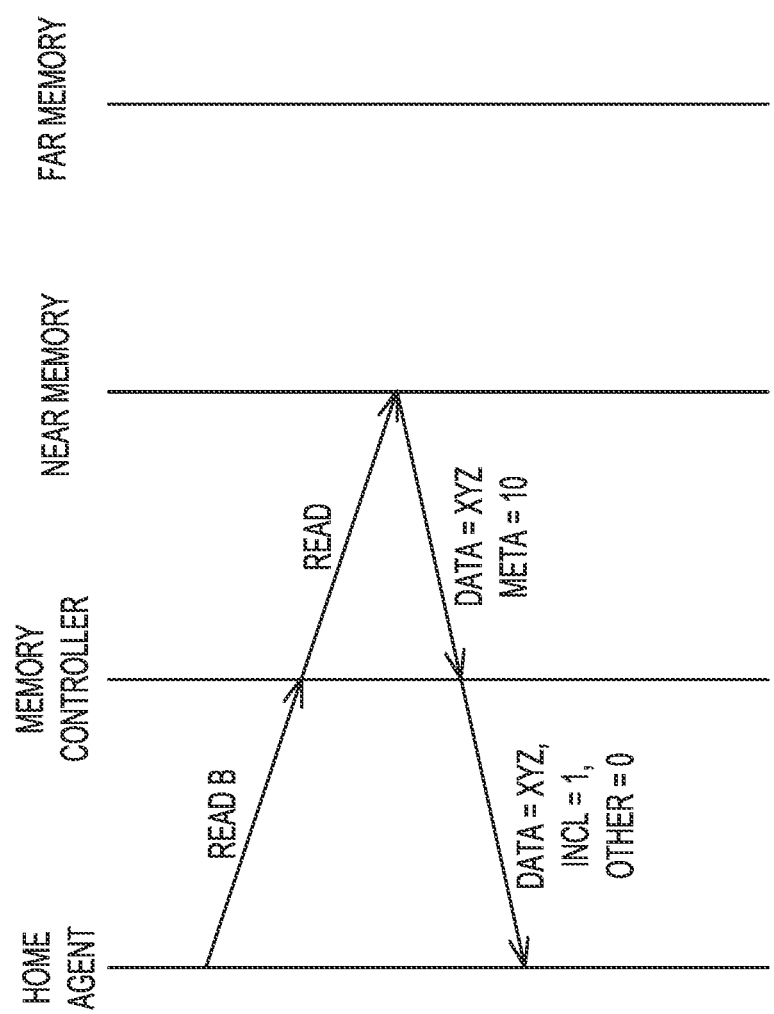
FIG. 5 is a diagram showing a transaction flow related to a write operation in accordance with one example.

FIG. 5 is a diagram showing a transaction flow 500 relating to the transactions that use an additional tag bit for the tag information and the data stored for each cache line. Transaction flow 500 is a continuation of the transaction flow shown in FIG. 4. When a cache line (e.g., cache line CL $A) is first brought into the system level cache, the inclusive bit is set. Using the inclusive bit, the system level cache controller (e.g., any of SLCC 116, SLCC 146, and SLCC 176 of FIG. 1) tracks if the cache line is guaranteed to be present in the near memory. Thus, in the example above, the inclusive bit for a cache line can be set when the SLC controller retrieves the cache line from the near memory. When a cache line is evicted out of the system level cache to be written to the near memory, if the inclusive bit is still set, this information is communicated to the near memory controller and it uses this information to skip the read before the write. Thus, as an example, when cache line CL $A is to be written to the near memory, the system level cache controller checks the inclusive bit in the tag to determine whether the inclusive bit is set. If the inclusive bit is set, the system level cache controller can inform the memory controller to skip the read operation from the near memory before writing to the memory space in the near memory corresponding to the cache line. While cache line CL $A is in the system level cache, if the system level cache controller receives a read request to any other cache line (e.g., cache line $C) in the same set of cache lines as cache line CL $A, it will clear the inclusive bit for all other cache lines within the same set of cache lines. Thus, in the system level cache, the inclusive bit for cache line CL $C is set while the inclusive bits for all other cache lines in the same set are off. This is the system level cache controller's way of communicating to the memory controller that it can no longer guarantee that when a cache line within that particular set of cache lines is written to the near memory, it will still be present in the near memory.

With continued reference to FIG. 5, as indicated in transaction flow 500, in response to a read request to read data for cache line CL $B, there is a hit in the near memory. As a result, the data (e.g., XYZ) from the near memory for cache line CL $B is returned to the memory controller indicating that the near memory contains cache line CL $B and the other cache line CL $A is all zeros. In addition, the data XYZ is returned to the home agent with the inclusive bit (INCL) set to logical value "1" indicating that the near memory contains cache line CL $B. Moreover, the other bit (OTHER) is set to zero indicating that the other cache line CL $A is all zeros.

Figure 6:
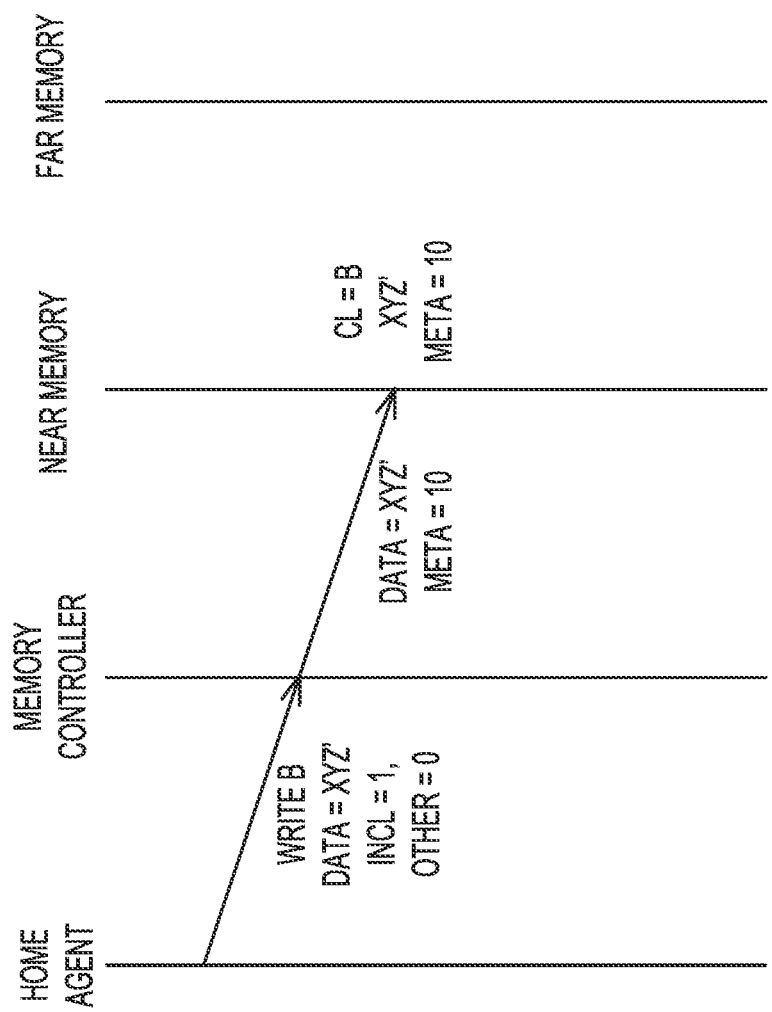
FIG. 6 is a diagram showing a transaction flow related to a write operation in accordance with one example.

FIG. 6 is a diagram showing a transaction flow 600 relating to the transactions that occur when the home agent initiates a write cache line CL $B operation. Transaction flow 600 is a continuation of the transactions shown in FIG. 5. In this instance data XYZ' is to be written. The system level cache controller (SLCC) communicates the status of the inclusive bit (INCL) is logical value "1" since cache line CL $B is guaranteed to be in the system level cache. In addition, the other bit (OTHER) is set to logical "0" because the other cache line CL $A is all zeros. This knowledge, in turn, helps prevent a read of the far memory when there is a request for reading of cache line CL $A because it can be synthesized by the memory controller. In this example, the contents of the near memory are modified from XYZ to XYZ' for the address in the near memory corresponding to cache line CL $B without any interaction with the far memory since the near memory contained cache line CL $B, as such.

Table 3, split into three portions (3A, 3B, and 3C), shows additional examples of operations associated with the systems and methods described herein. Each portion of table 3 includes a subset of the columns. At times, these tables are collectively referred to either as table 3 or as tables 3A-3C. These examples assume that the near memory is implemented using DRAM and the far memory is implemented using the Compute Express Link (CXL) specification compliant memory. Accordingly, these examples refer to DDR transactions associated with the DRAM and CXL transactions associated with the CXL memory. Each row of table 3 relates to a specific operation similar to the ones described earlier as part of transaction flows 300 of FIG. 3, 400 of FIG. 4, 500 of FIG. 5, 600 of FIG. 6, and 700 of FIG. 7. In addition, each of the operations described in table 3 is described as independent of the other operations.

Each operation is described by identifying the operation being performed, the starting state of the various items, the bits (e.g., inclusive, other, and metatag portion) and data values being communicated, the near memory and far memory transactions, if any, and the ending state of the various items. In this example, the starting state may include the status of the state bit (e.g., modified, exclusive, shared, or invalid bit), the inclusive bit and the other bit for each of the cache lines (e.g., CL $A and CL $B) stored in the system level cache. The starting state may further include the data values corresponding to each of the cache lines (e.g., near memory or far memory). The starting state may further include the values for the metatag portion, including the metatag values for the current line and the other line, as described earlier with respect to table 1 and the transaction flows. Similarly, in this example, the ending state may include the status of the state bit (e.g., modified, exclusive, shared, or invalid bit), the inclusive bit and the other bit for each of the cache lines (e.g., CL $A and CL $B) stored in the system level cache after an operation has been completed. The ending state may further include the data values corresponding to each of the cache lines (e.g., near memory or far memory). The ending state may further include the values for the metatag portion, including the metatag values for the current line and the other line, as described earlier with respect to table 1 and the transaction flows. Table 3A below lists the example operations associated with the systems described herein and table 3A also shows the values of the various bits and data values for respective operations.

TABLE 3A

| | Starting State | | | | | |
|---|---|---|---|---|---|---|
| Operation | SLCC $A {ST, Inc, Oth} | SLCC $B {ST, Inc, Oth} | NEAR MEMORY | FAR MEMORY | Meta Current Line | Meta Other Line |
| Rd A | I, x, x | I, x, x | $A = 0x0 | $B = 0x0 | 0 | 0 |
| Wr A | M, 1, 0 | I, x, x | $A = 0x0 | $B = 0x0 | 0 | 0 |
| Rd B | I, x, x | I, x, x | $B != 0x0 | $A = 0x0 | 1 | 0 |
| Wr B | I, x, x | M, 1, 0 | $B != 0x0 | $A = 0x0 | 1 | 0 |
| Rd B | I, x, x | I, x, x | $A = 0x0 | $B = 0x0 | 0 | 0 |
| Wr B | I, x, x | M, 0, 0 | $A = 0x0 | $B != 0x0 | 0 | 1 |
| Rd B | I, x, x | I, x, x | $A != 0x0 | $B != 0x0 | 1 | 1 |
| Wr B | I, x, x | M, 1, 1 | $B != 0x0 | $A != 0x0 | 1 | 1 |
| Wr0 B | I, x, x | M, 1, 1 | $A != 0x0 | $B != 0x0 | 0 | 1 |
| Rd A | I, x, x | I, x, x | $B = 0x0 | $A != 0x0 | 1 | 1 |
| Rd B | I, x, x | I, x, x | $B = 0x0 | $A != 0 | 1 | 1 |
| Wr B | I, x, x | M, 1, 1 | $B = 0x0 | $A != 0 | 1 | 1 |
| Rd B | I, x, x | I, x, x | $A != 0x0 | $B = 0x0 | 0 | 0 |
| Wr B | I, x, x | M, 0, 0 | $A != 0x0 | $B = 0x0 | 0 | 0 |
| NTWr0 A | I, x, x | I, x, x | $A != 0x0 | $B = 0x0 | 0 | 0 |
| NTWr0 B | I, x, x | I, x, x | $A = 0x0 | $B != 0x0 | 0 | 1 |

Table 3B below lists the example operations associated with the systems described herein and table 3B also shows the values of the various bits and data values for respective operations.

TABLE 3B

| | From MC to SLCC From SLCC to MC | | | Near Memory | Far Memory |
|---|---|---|---|---|---|
| Operation | Incl | Other | Data | Transaction | Transaction |
| Rd A | 1 | 0 | $A=0x0 | Read | None |
| Wr A | 1 | 0 | $A!=0x0 | Write | None |
| Rd B | 1 | 0 | $B!=0x0 | Read | None |
| Wr B | 1 | 0 | $B!=0x0 | Write | None |
| Rd B | 0 | 0 | $B=0x0 | Read | None |
| Wr B | 0 | 0 | $B!=0x0 | Read, Write | None |
| Rd B | 1 | 1 | $B!=0x0 | Read, Write | Read, Write |
| Wr B | 1 | 1 | $B!=0x0 | Write | None |
| Wr0 B | 0 | 1 | $B=0x0 | Read, Write | None |
| Rd A | 1 | 0 | $A!=0x0 | Read, Write | Read |
| Rd B | 1 | 0 | $B=0x0 | Read | None |
| Wr B | 1 | 1 | $B!=0x0 | Write | None |
| Rd B | 0 | 0 | $B=0x0 | Read | None |
| Wr B | 0 | 0 | $B!=0x0 | Read, Write | Write |
| NTWr0 A | 0 | 1 | $A=0x0 | Read, Write | None |
| NTWr0 B | 0 | 1 | $B=0x0 | Read, Write | None |

Table 3C below lists the example operations associated with the systems described herein and table 3C also shows the values of the various bits and data values for respective operations.

TABLE 3C

| | Ending State | | | | | |
|---|---|---|---|---|---|---|
| Operation | SLCC $A {ST, Inc, Oth} | SLCC $B {ST, Inc, Oth} | NEAR MEMORY | FAR MEMORY | Meta Current Line | Meta Other Line |
| Rd A | M/E/S, 1, 0 | I, x, x | $A = 0x0 | $B = 0x0 | 0 | 0 |
| Wr A | I, x, x | I, x, x | $A != 0x0 | $B = 0x0 | 0 | 0 |
| Rd B | I, x, x | M/E/S, 1, 0 | $B != 0x0 | $A = 0x0 | 1 | 0 |
| Wr B | I, x, x | I, x, x | $B != 0x0 | $A = 0x0 | 1 | 0 |
| Rd B | I, x, x | M/E/S, 0, 0 | $A = 0x0 | $B = 0x0 | 0 | 0 |
| Wr B | I, x, x | I, x, x | $B != 0x0 | $A = 0x0 | 1 | 0 |
| Rd B | I, x, x | M/E/S, 1, 1 | $B != 0x0 | $A != 0x0 | 1 | 1 |
| Wr B | I, x, x | I, x, x | $B != 0x0 | $A != 0x0 | 1 | 1 |
| Wr0 B | I, x, x | I, x, x | $A != 0x0 | $B = 0x0 | 0 | 0 |
| Rd A | M/E/S, 1, 0 | I, x, x | $A != 0x0 | $B = 0x0 | 0 | 0 |
| Rd B | I, x, x | M/E/S, 1, 1 | $B = 0x0 | $A != 0x0 | 1 | 1 |
| Wr B | I, x, x | I, x, x | $B != 0x0 | $A != 0x0 | 1 | 1 |
| Rd B | I, x, x | M/E/S, 0, 0 | $A != 0x0 | $B = 0x0 | 0 | 0 |
| Wr B | I, x, x | I, x, x | $B != 0x0 | $A != 0x0 | 1 | 1 |
| NTWr0 A | I, x, x | I, x, x | $A = 0x0 | $B = 0x0 | 0 | 0 |
| NTWr0 B | I, x, x | I, x, x | $A = 0x0 | $B = 0x0 | 0 | 0 |

With continued reference to table 3, the read operation Rd A is described. Operation Rd A relates to a case where a CPU (or a core associated with a CPU) is attempting to read the cache line stored at address A (CL $A). As shown in Table 3A, the MESI status for both cache line stored at address A and address B (CL $B) is invalid (I). The near memory has the cache line CL $A and the far memory has the cache line CL $B. Because these cache lines are stored in a direct swap cache manner, at a time only one of CL $A and CL $B can be in the near memory. The metadata portion (Meta Current Line and Meta Other Line) indicated that the current cache line in the near memory is CL $A and the other cache line (e.g., CL $B) comprises zeros. Table 3B shows that as part of operation Rd A, the memory controller (MC) sends the values for the inclusive bit (Inc) and the other bit (Other) to the system level cache controller (SLCC). The inclusive bit is set to 1 and in this manner the MC can let SLCC know that cache line CL $A is in the near memory. The other bit is set to 1 and in this manner the MC can let SLCC know that the other cache line (CL $B) is all zeros. Since the near memory has the cache line (CL $A) being read, it is a hit; accordingly, as shown in table 3B, there is a near memory transaction (e.g., a DDR transaction), but there is no far memory transaction (e.g., a CXL transaction). The value of the cache line being read is provided to the requesting entity. As shown in table 3C, in terms of the ending state, there is no change with respect to the bit values associated with cache line CL $B since the read operation relates to cache line CL $A. The MESI (modified, exclusive, shared, or invalid) status for cache line CL $A is changed from invalid (I) to one of modified (M), exclusive (E), or shared (S). In addition, the include bit sent by the MC is maintained by the SLCC on the system level cache end since cache line CL $A is now guaranteed to be in the near memory. Finally, since this is a read operation, there is no change to both the metadata information (Metal Current Line and Meta Other Line) and to the data values in the near memory or the far memory.

Still referring to tables 3A-3C, the write operation Wr A with reference to the second row (not counting the row headers) of each of tables 3A-3C is described. This example assumes that cache line CL $A is now dirty and because of an eviction from the system level cache needs to be written to the near memory. This is indicated by the status bit as being modified (M). Other values are the same as before when the operation Rd A was performed. Table 3B shows that as part of operation Wr A, the system level cache controller (SLCC) sends the values for the inclusive bit (Inc) and the other bit (Other) to the memory controller (MC). The inclusive bit is set to 1 indicating that cache line CL $A is guaranteed to be in the near memory. This means that the MC can perform a blind write operation and need not perform a read before write. The other bit is set to 0 and in this manner the MC knows that the other cache line (CL $B) is all zeros and that fact is still tracked. Since the cache line (CL $A) is being written to the near memory, accordingly, as shown in table 3B, there is a near memory transaction (e.g., a DDR transaction), but there is no far memory transaction (e.g., a CXL transaction). As shown in table 3C, the ending state is the same as before, except that the status of cache line CL $A in system level cache is now invalid (I).

With continued reference to tables 3A-3C, the Rd B operation in the third row is a read hit case and the other cache line state is sent by the MC to the SLCC. The Wr B operation in the fourth row is a write operation that is performed while tracking the all-zeros state of the other cache line.

Next, operation (Rd B) in the fifth row of table 3 is described. In this case, cache line CL $B is in the far memory and is all zeros. Accordingly, the memory controller (MC) need not retrieve the cache line from the far memory; instead, the MC synthesizes the zeros and provides those to the requesting entity. In sum, because of the use of the metadata (Meta Other Line), while a DDR transaction occurs, no CXL transaction occurs—saving both power and time.

Still referring to tables 3A-3C, the write operation Wr B with reference to the sixth row (not counting the row headers) of each of tables 3A-3C is described. This example relates to writing of cache line CL $B and is used to illustrate the auto-swap operation. As shown in table 3B, the memory controller (MC) communicates to the system level cache controller (SLCC) the status of the inclusive bit and the other bit as logical "0." In this example, first there is a read request from the memory controller to read cache line CL $B. Using this read request, the memory controller (e.g., any of the near memory controllers described earlier with respect to FIG. 1) checks the contents of the near memory. The metatag portion in this example is 00, indicating that the near memory contains cache line CL $A, resulting in a miss. The metatag portion, however, further indicates that the other cache line (CL $B) that is in the far memory comprises zeros only. In this case, instead of retrieving the cache line CL $B from the far memory, the memory controller performs an auto-swap operation. The auto-swap operation includes the memory controller writing the data into the near memory for cache line CL $B and changing the metatag portion from 00 to 10 indicating that the cache line CL $B does not contain all zeros (reflected in the ending state in the sixth row of table 3C). No change is made with respect to the metatag portion (00) associated with the cache line CL $A since that cache line has all zeros both in the near memory location and the far memory location. Advantageously, as a result, an access to the far memory is not required, saving both power and time.

With reference to the tables 3A-3C, the operations beginning with the seventh row (operation Rd B) to the fourteenth row (operation Wr B) are only summarized. Rd B operation in the seventh row of table 3 is a regular swap operation resulting in the contents of the near memory and far memory swapped with each other. Wr B operation in the eighth row of table 3 is a normal write operation. Wr0 B operation in the ninth row of the table 3 is notable in that cache line CL $B is not written to the far memory because the metadata (Meta Other Line is zero) tracks the state of the cache line as being all zeros in the far memory. Rd A operation in the tenth row of table 3 is also notable in that cache line CL $B is not written to the far memory because the metadata (Meta Other Line is zero) tracks the state of the cache line as being all zeros in the far memory.

Still referring to tables 3A-3C, Rd B in the eleventh row of table 3 is a regular read hit case. Notably, the other line state (Meta Other Line) is sent by the memory controller (MC) to the system level cache controller (SLCC). Wr B operation in the twelfth row of table 3 is a write operation and includes preservation of the tracking of the non-zero status of the other line via the metadata (Meta Other Line). Rd B operation in the thirteenth row is a read operation that results in the memory controller (MC) synthesizing the zeros and no far memory transaction is generated. As part of Wr B operation in the fourteenth row of table 3, cache line CL $A gets swapped out for cache line CL $B without a read to the far memory and thus saving the power and time required for such operation.

With continued reference to tables 3A-3C, in the fifteenth row and the sixteenth row, non-temporal (NT) operations are described. These non-temporal write operations (NT Wr operations) are usually performed with respect to a region of memory that is marked as weakly ordered. These operations are different because unlike other writes, which require a read before write, an NT write operation is performed without a prior read operation. As an example, the NT write operations may be used when the goal is to zero out memory contents. Assuming a virtual machine (VM) or the operating system (OS) wants to zero out a certain amount of memory, then it starts writing zeros to every address within an address range associated with the relevant memory by using a non-temporal write operation that does not require a read before write. NTWr0 A operation in the fifteenth row of table 3 is an example non-temporal write operation with respect to cache line CL $A. Cache line CL $B is assumed to be all zeros in this example. The system level cache controller (SLCC) indicates the status of the bit as invalid to the memory controller (MC) and does not care about the status of the inclusive bit and the other bit. A DDR read transaction occurs followed by a write to the near memory because this was hit. No CXL transaction occurs. The all zeros tracking for cache line CL $B is preserved by the SLCC by indicating to the MC the value of the metadata (Meta Other Line) as logical "1." NTWr0 B operation in the sixteenth row of table 3 is an example of a non-temporal write operation with respect to cache line CL $B. In this case, the write operation results in a miss because cache line CL $B is in the far memory (e.g., in a CXL-attached device). Because this is a non-temporal write operation the inclusive bit in this case is not set. The data that is being requested to be written is all zeros. Although the near memory has cache line CL $A (see starting state in row sixteen of table 3A), and the write operation is for cache line CL $B, instead of performing a write operation on the far memory (and generating a CXL transaction), the metadata (meta other line) is set back to logical value "0." In other words, the value of cache line CL $B in the far memory is irrelevant to this non-temporal write operation.

Figure 7:
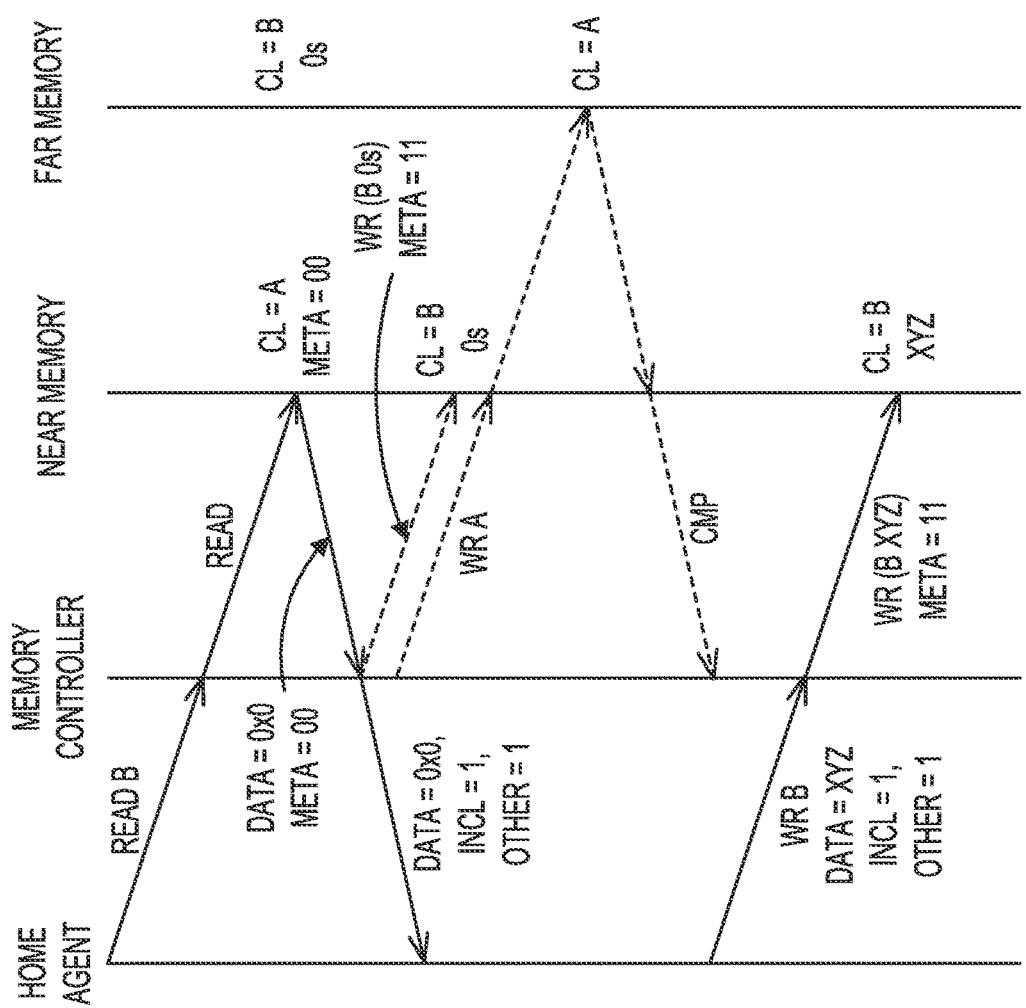
FIG. 7 shows an example transaction flow related to a read operation with a speculative swap and a subsequent write operation.

FIG. 7 shows an example transaction flow 700 related to a read operation with a speculative swap and a subsequent write operation. As explained earlier, during a read operation, a CPU (e.g., any of CPUs 112, 142, or 172 of FIG. 1) can issue a command that is processed by a home agent associated with a memory controller (e.g., any of memory controllers 118, 148, and 178 of FIG. 1) to read data. In this example, first there is a read request from the home agent to read cache line CL $B. The memory controller (e.g., any of the near memory controllers described earlier with respect to FIG. 1) checks the contents of the near memory. The metatag portion in this example is "00" indicating that the near memory contains cache line CL $A, resulting in a miss. In this example, the metatag portion further indicates that the other cache line (CL $B) that is in the far memory comprises zeros only. As a result, the inclusive bit (INCL) is indicated as being logical value "0" and the other bit (OTHER) is also indicated as being logical value "0." Notably, in this case (as was described earlier with respect to transaction flow 300 of FIG. 3), instead of retrieving the cache line CL $B from the far memory, the memory controller synthesizes the data portion corresponding to cache line CL $B to generate synthesized data portion (all zeros) and transmits the synthesized data portion and the metadata portion to the home agent. Advantageously, as a result, an access to far memory is not required, saving both power and time.

With continued reference to FIG. 7, in this example as shown via the dotted portion of the transaction flow, after servicing the write operation for cache line CL $B, the memory controller (MC) may perform a speculative swap by writing the cache line CL $A to the far memory and updating the metadata portion in the near memory to reflect the fact that the near memory now contains the speculatively swapped-in cache line CL $A. Having updated the metadata portion, the memory controller may write the cache line CL $A to the far memory. Notably, if the cache line CL $A is indicated as being all zeros, then the memory controller need not perform the write operation to the far memory because the metadata portion (Meta Other Line) simply reflects that status.

Still referring to FIG. 7, the bottom portion of transaction flow 700 shows the transactions associated with a write cache line CL $B operation. The benefit of the speculative swap operation described above is that if the next transaction involves writing the cache line CL $B, then the SLCC can use the previously set inclusive bit and perform a write operation to the near memory for the cache line CL $B without looking up the value in the near memory. In this instance data XYZ is to be written. The system level cache controller (SLCC) communicates the status of the inclusive bit (INCL) as logical value "1" since cache line CL $B is guaranteed to be in the system level cache. In addition, the other bit (OTHER) is set to logical "1" because the other cache line CL $A is not all zeros. In this example, the contents of the near memory are modified from 00 to XYZ for the address in the near memory corresponding to cache line CL $B without any interaction with the far memory.

Figure 8:
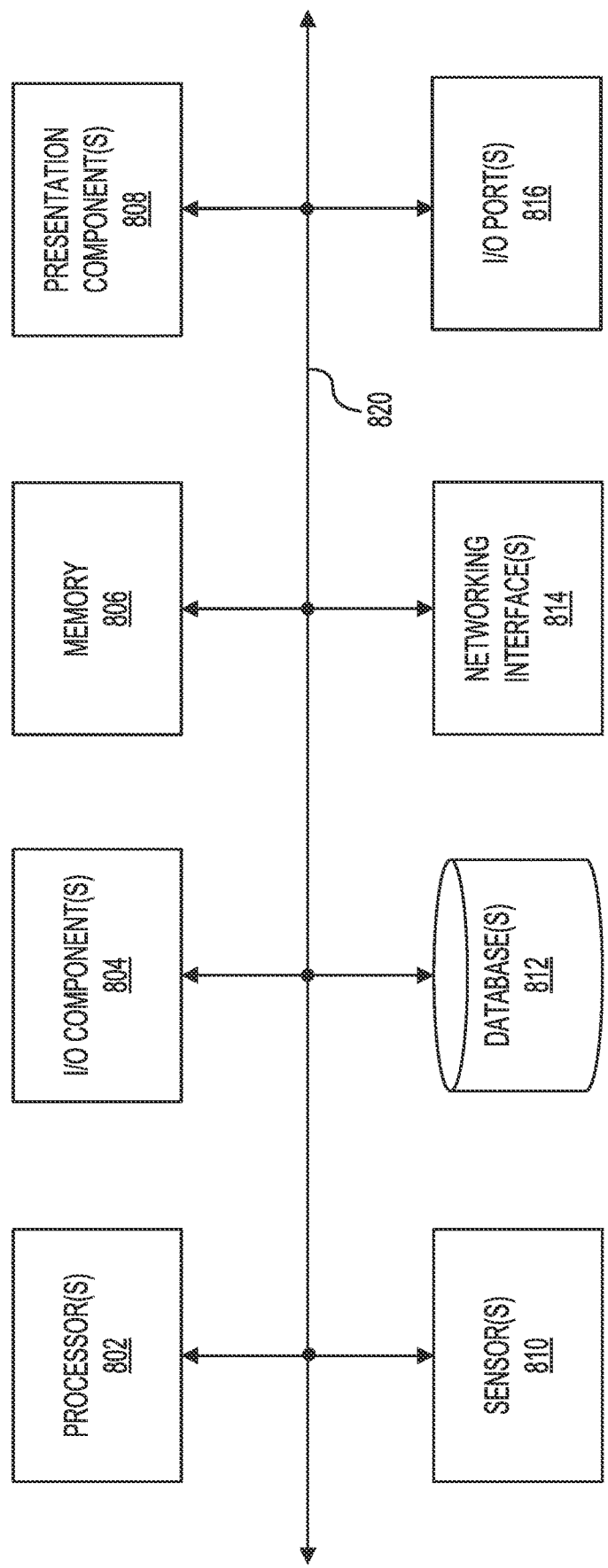
FIG. 8 shows a block diagram of an example system for implementing at least some of the methods for direct swap caching with zero line optimizations.

FIG. 8 shows a block diagram of an example system 800 for implementing at least some of the methods for integrated memory pooling and direct swap caching. System 800 may include processor(s) 802, I/O component(s) 804, memory 806, presentation component(s) 808, sensors 810, database(s) 812, networking interfaces 814, and I/O port(s) 816, which may be interconnected via bus 820. Processor(s) 802 may execute instructions stored in memory 806. I/O component(s) 804 may include components such as a keyboard, a mouse, a voice recognition processor, or touch screens. Memory 806 may be any combination of non-volatile storage or volatile storage (e.g., flash memory, DRAM, SRAM, or other types of memories). Presentation component(s) 808 may include displays, holographic devices, or other presentation devices. Displays may be any type of display, such as LCD, LED, or other types of display. Sensor(s) 810 may include telemetry or other types of sensors configured to detect, and/or receive, information (e.g., collected data). Sensor(s) 810 may include telemetry or other types of sensors configured to detect, and/or receive, information (e.g., memory usage by various compute entities being executed by various compute nodes in a data center). Sensor(s) 810 may include sensors configured to sense conditions associated with CPUs, memory or other storage components, FPGAs, motherboards, baseboard management controllers, or the like. Sensor(s) 810 may also include sensors configured to sense conditions associated with racks, chassis, fans, power supply units (PSUs), or the like. Sensor(s) 810 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 8, database(s) 812 may be used to store any of the data collected or logged and as needed for the performance of methods described herein. Database(s) 812 may be implemented as a collection of distributed databases or as a single database. Network interface(s) 814 may include communication interfaces, such as Ethernet, cellular radio, Bluetooth radio, UWB radio, or other types of wireless or wired communication interfaces. I/O port(s) 816 may include Ethernet ports, Fiber-optic ports, wireless ports, or other communication or diagnostic ports. Although FIG. 8 shows system 800 as including a certain number of components arranged and coupled in a certain way, it may include fewer or additional components arranged and coupled differently. In addition, the functionality associated with system 800 may be distributed, as needed.

Figure 9:
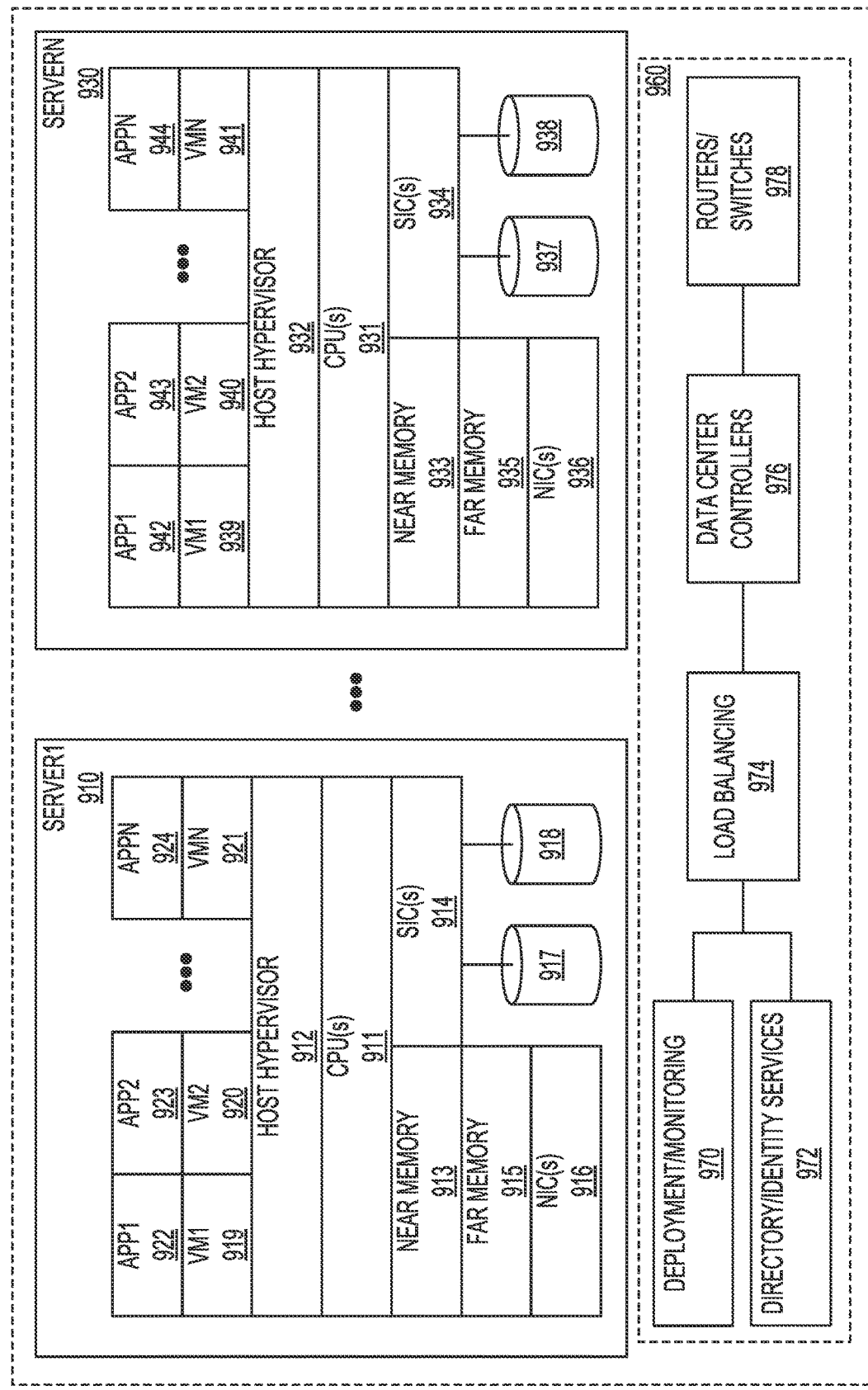
FIG. 9 shows a data center for implementing a system for direct swap caching with zero line optimizations.

FIG. 9 shows a data center 900 for implementing a system for integrated memory pooling and direct swap caching in accordance with one example. As an example, data center 900 may include several clusters of racks including platform hardware, such as compute resources, storage resources, networking resources, or other types of resources. Compute resources may be offered via compute nodes provisioned via servers that may be connected to switches to form a network. The network may enable connections between each possible combination of switches. Data center 900 may include server1 910 and serverN 930. Data center 900 may further include data center related functionality 960, including deployment/monitoring 970, directory/identity services 972, load balancing 974, data center controllers 976 (e.g., software defined networking (SDN) controllers and other controllers), and routers/switches 978. Server1 910 may include CPU(s) 911, host hypervisor 912, near memory 913, storage interface controller(s) (SIC(s)) 914, far memory 915, network interface controller(s) (NIC(s)) 916, and storage disks 917 and 918. Far memory 915 may be implemented as a pooled memory, as explained earlier. ServerN 930 may include CPU(s) 931, host hypervisor 932, near memory 933, storage interface controller(s) (SIC(s)) 934, far memory 935, network interface controller(s) (NIC(s)) 936, and storage disks 937 and 938. Far memory 935 may be implemented as a pooled memory, as explained earlier. Server1 910 may be configured to support virtual machines, including VM1 919, VM2 920, and VMN 921. The virtual machines may further be configured to support applications, such as APP1 922, APP2 923, and APPN 924. ServerN 930 may be configured to support virtual machines, including VM1 939, VM2 940, and VMN 941. The virtual machines may further be configured to support applications, such as APP1 942, APP2 943, and APPN 944.

With continued reference to FIG. 9, in one example, data center 900 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 9 shows data center 900 as including a certain number of components arranged and coupled in a certain way, it may include fewer or additional components arranged and coupled differently. In addition, the functionality associated with data center 900 may be distributed or combined, as needed.

Figure 10:
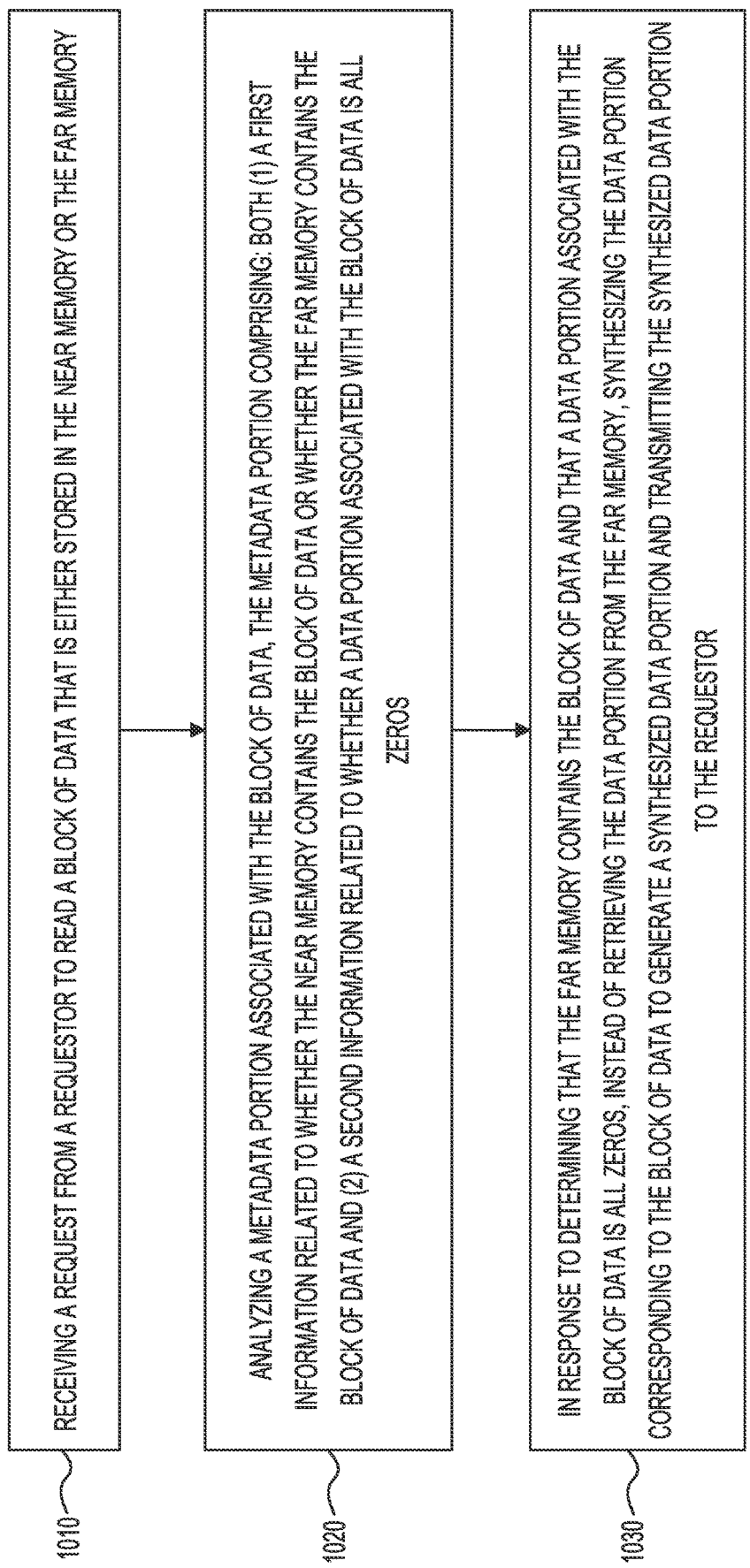
FIG. 10 shows a flow chart of an example method for managing a memory having a near memory and a far memory.

FIG. 10 shows a flow chart 1000 of an example method for managing a memory having a near memory and a far memory. In one example, steps associated with this method may be executed by various components of the systems described earlier (e.g., system 100 of FIG. 1 and system 200 of FIG. 2). Step 1010 may include receiving a request from a requestor to read a block of data that is either stored in the near memory or the far memory. As an example, a read request may be a read request from a home agent as shown in transaction flow 300 of FIG. 3. The home agent may be the last level cache controller (e.g., any of SLCC 116, SLCC 146, and SLCC 176 of FIG. 1) or any other controller that controls the coherency for a given cache line.

Step 1020 may include analyzing a metadata portion associated with the block of data, the metadata portion comprising: both (1) a first information related to whether the near memory contains the block of data or whether the far memory contains the block of data and (2) a second information related to whether a data portion associated with the block of data is all zeros. The memory controller (e.g., any of the near memory controllers described earlier with respect to FIG. 1) may analyze the metadata portion. As an example, the metatag portion in one example may be "00" indicating that the near memory does not contain the block of data and instead it is stored in the far memory and it is all zeros. This is similar to the example described with respect to transaction flow 300 of FIG. 3 in which the metatag portion indicates that the other cache line (CL $B) that is in the far memory comprises zeros only.

Step 1030 may include in response to determining that the far memory contains the block of data and that a data portion associated with the block of data is all zeros, instead of retrieving the data portion from the far memory, synthesizing the data portion corresponding to the block of data to generate synthesized data portion and transmitting the synthesized data portion to the requestor. Notably, in this case, instead of retrieving the block of data (e.g., the cache line CL $B) from the far memory, the memory controller may synthesize the data portion corresponding to the block of data to generate a synthesized data portion (all zeros) and transmit the synthesized data portion to the home agent. Advantageously, as a result, an access to far memory is not required, saving both power and time. In one example, the synthesized data portion (e.g., all zeros) corresponding to the data portion (e.g., 512 bits) may be generated by the near memory controller (e.g., any of memory controllers 118, 148, and 178 of FIG. 1) by taking 512 bits that are grounded, and are thus effectively zeros, and providing those in response to the read operation.

Figure 11:
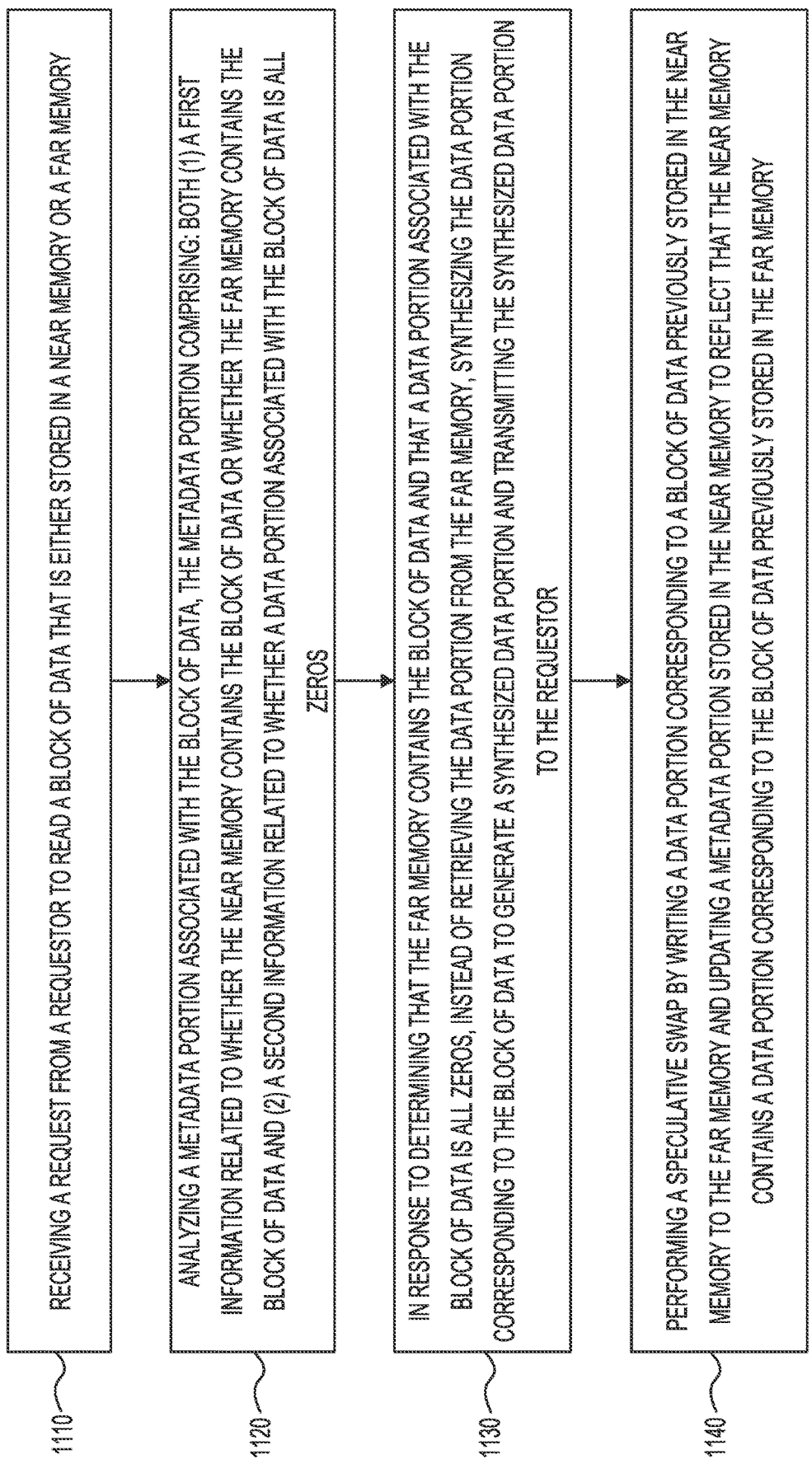
FIG. 11 shows a flow chart of another example method for managing a memory having a near memory and a far memory.

FIG. 11 shows a flow chart 1100 of an example method for managing a memory having a near memory and a far memory. In one example, steps associated with this method may be executed by various components of the systems described earlier (e.g., system 100 of FIG. 1 and system 200 of FIG. 2). Step 1110 may include receiving a request from a requestor to read a block of data that is either stored in the near memory or the far memory. As an example, a read request may be a read request from a home agent as shown in transaction flow 700 of FIG. 7. The home agent may be the last level cache controller (e.g., any of SLCC 116, SLCC 146, and SLCC 176 of FIG. 1) or any other controller that controls the coherency for a given cache line.

Step 1120 may include analyzing a metadata portion associated with the block of data, the metadata portion comprising: both (1) a first information related to whether the near memory contains the block of data or whether the far memory contains the block of data and (2) a second information related to whether a data portion associated with the block of data is all zeros. The memory controller (e.g., any of the near memory controllers described earlier with respect to FIG. 1) may analyze the metadata portion. As an example, the metatag portion in one example may be "00" indicating that the near memory does not contain the block of data and instead it is stored in the far memory and it is all zeros. This is similar to the example described with respect to transaction flow 700 of FIG. 7 in which the metatag portion indicates that the other cache line (CL $A) that is in the far memory comprises zeros only.

Step 1130 may include in response to determining that the far memory contains the block of data and that a data portion associated with the block of data is all zeros, instead of retrieving the data portion from the far memory, synthesizing the data portion corresponding to the block of data to generate synthesized data portion and transmitting the synthesized data portion to the requestor. Notably, in this case, instead of retrieving the block of data (e.g., the cache line CL $A) from the far memory, the memory controller may synthesize the data portion corresponding to the block of data to generate a synthesized data portion (all zeros) and transmit the synthesized data portion and the metadata portion to the home agent. Advantageously, as a result, an access to far memory is not required, saving both power and time.

Step 1140 may include performing a speculative swap by writing a data portion corresponding to a block of data previously stored in the near memory to the far memory and updating a metadata portion stored in the near memory to reflect that the near memory contains a data portion corresponding to the block of data previously stored in the far memory. In this example, after servicing the write operation for the block of data (e.g., the write operation for cache line CL $B described with respect to transaction flow 700 of FIG. 7), the memory controller (MC) may perform a speculative swap by writing the current block of data in the near memory (e.g., the cache line CL $A) to the far memory and updating the metadata portion in the near memory to reflect the fact that the near memory now contains the speculatively swapped-in block of data (e.g., the cache line CL $A). Having updated the metadata portion, the memory controller may write the block of data (e.g., the cache line CL $A) to the far memory.

In conclusion, the present disclosure relates to a method for managing a system having a near memory and a far memory. The method may include receiving a request from a requestor to read a block of data that is either stored in the near memory or the far memory. The method may further include analyzing a metadata portion associated with the block of data, the metadata portion comprising: both (1) a first information related to whether the near memory contains the block of data or whether the far memory contains the block of data and (2) a second information related to whether a data portion associated with the block of data is all zeros. The method may further include in response to determining that the far memory contains the block of data and that a data portion associated with the block of data is all zeros, instead of retrieving the data portion from the far memory, synthesizing the data portion corresponding to the block of data to generate a synthesized data portion and transmitting the synthesized data portion to the requestor.

Each block of data may comprise a cache line for a central processing unit (CPU) associated with the system. As part of the method, the synthesizing the data portion corresponding to the block of data to generate the synthesized data portion may comprise a memory controller associated with the near memory providing grounded bits associated with the data portion.

The method may further comprise, a system level cache controller, associated with the system, tracking information regarding whether a cache line is guaranteed to be located in the near memory. The method may further comprise the system level cache controller tracking information regarding whether a cache line located in the far memory comprises all zeros. The near memory may comprise a first swappable range of memory addresses allocable to a process for execution by the CPU, where the far memory may comprise a second swappable range of memory addresses allocable to the process for execution by the CPU, and a ratio of a size of the first swappable range of memory addresses associated with the near memory and a size of the second swappable range of memory addresses associated with the far memory may be fixed.

In another aspect, the present disclosure relates to a system having a near memory and a far memory. The system may include a near memory controller configured to receive a request from a requestor to read a block of data that is either stored in the near memory or the far memory. The system may further include the near memory controller further configured to analyze a metadata portion associated with the block of data, the metadata portion comprising: both (1) a first information related to whether the near memory contains the block of data or whether the far memory contains the block of data and (2) a second information related to whether a data portion associated with the block of data is all zeros. The system may further include the near memory controller further configured to, in response to determining that the far memory contains the block of data and that a data portion associated with the block of data is all zeros, instead of retrieving the data portion from the far memory, synthesize the data portion corresponding to the block of data to generate a synthesized data portion and transmit the synthesized data portion to the requestor.

The system may further comprise a central processing unit (CPU) and each block of data may comprise a cache line for the CPU. The near memory controller may be configured to provide grounded bits associated with the data portion as the synthesized data portion.

The system may further comprise a system level cache controller configured to track information regarding whether a cache line is guaranteed to be located in the near memory. The system level cache controller may further be configured to track information regarding whether a cache line located in the far memory comprises all zeros. The near memory may comprise a first swappable range of memory addresses allocable to a process for execution by the CPU, the far memory may comprise a second swappable range of memory addresses allocable to the process for execution by the CPU, and a ratio of a size of the first swappable range of memory addresses associated with the near memory and a size of the second swappable range of memory addresses associated with the far memory may be fixed.

In a yet another aspect, the present disclosure relates to a method for managing a system having a near memory and a far memory. The method may include receiving a request from a requestor to read a block of data that is either stored in the near memory or the far memory. The method may further include analyzing a metadata portion associated with the block of data, the metadata portion comprising: both (1) a first information related to whether the near memory contains the block of data or whether the far memory contains the block of data and (2) a second information related to whether a data portion associated with the block of data is all zeros.

The method may further include in response to determining that the far memory contains the block of data and that a data portion associated with the block of data is all zeros, instead of retrieving the data portion from the far memory, synthesizing the data portion corresponding to the block of data to generate a synthesized data portion and transmitting the synthesized data portion to the requestor. The method may further include performing a speculative swap by writing a data portion corresponding to a block of data previously stored in the near memory to the far memory and updating a metadata portion stored in the near memory to reflect that the near memory contains a data portion corresponding to the block of data previously stored in the far memory.

Each block of data may comprise a cache line for a central processing unit (CPU) associated with the system. As part of the method, the synthesizing the data portion corresponding to the block of data to generate the synthesized data portion may comprise a near memory controller associated with the near memory providing grounded bits associated with the data portion.

The method may further comprise, a system level cache controller, associated with the system, tracking information regarding whether a cache line is guaranteed to be located in the near memory. The method may further comprise the system level cache controller tracking information regarding whether a cache line located in the far memory comprises all zeros.

The near memory may comprise a first swappable range of memory addresses allocable to a process for execution by the CPU, where the far memory may comprise a second swappable range of memory addresses allocable to the process for execution by the CPU, and a ratio of a size of the first swappable range of memory addresses associated with the near memory and a size of the second swappable range of memory addresses associated with the far memory may be fixed. The near memory may be managed using a near memory controller and the far memory may be managed using a far memory controller configured to communicate with the near memory controller.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for managing a system having a system level cache, a near memory, and a far memory, wherein cache lines associated with the system level cache can be swapped between the near memory and the far memory, the method comprising:
   receiving a write request from a requestor to write non-zero data corresponding to an address; and
   prior to writing the non-zero data:
      analyzing a first metadata portion to determine whether a current cache line stored at the address in the near memory is guaranteed to be in the system level cache, and
      analyzing a second metadata portion to determine whether a data portion associated with another cache line swappable with the current cache line comprises all zeros.

2. The method of claim 1, further comprising upon determining that the current cache line stored at the address in the near memory is guaranteed to be in the system level cache and that the data portion associated with the another cache line swappable with the current cache line comprises all zeros, writing the non-zero data corresponding to the address in the near memory.

3. The method of claim 2, wherein the writing the non-zero data corresponding to the address in the near memory results in a completion of the write request and there is no further interaction with the far memory in response to the write request.

4. The method of claim 1, wherein the current cache line and the another cache line are stored in a direct-swap manner such that at a given time only one of the current cache line and the another cache line can be stored in the near memory.

5. The method of claim 1, wherein the system further comprises a system level cache controller (SLCC), and wherein the method further comprises the SLCC tracking information regarding whether a cache line is guaranteed to be located in the near memory.

6. The method of claim 5, further comprising the SLCC tracking information regarding whether a cache line located in the far memory comprises all zeros.

7. The method of claim 1, wherein the requestor comprises a central processing unit (CPU) associated with the system, wherein the near memory comprises a first swappable range of memory addresses allocable to a process for execution by the CPU, wherein the far memory comprises a second swappable range of memory addresses allocable to the process for execution by the CPU, and wherein a ratio of a size of the first swappable range of memory addresses associated with the near memory and a size of the second swappable range of memory addresses associated with the far memory is fixed.

8. A system comprising a system level cache, a near memory, and a far memory, wherein cache lines associated with the system level cache can be swapped between the near memory and the far memory, the system comprising:
   a near memory controller configured to receive a write request from a requestor to write non-zero data corresponding to an address; and
   wherein the near memory controller is further configured to, prior to writing the non-zero data:
      analyze a first metadata portion to determine whether a current cache line stored at the address in the near memory is guaranteed to be in the system level cache, and
      analyze a second metadata portion to determine whether a data portion associated with another cache line swappable with the current cache line comprises all zeros.

9. The system of claim 8, wherein the near memory controller is further configured to, upon determining that the current cache line stored at the address in the near memory is guaranteed to be in the system level cache and that the data portion associated with the another cache line swappable with the current cache line comprises all zeros, write the non-zero data corresponding to the address in the near memory.

10. The system of claim 8, wherein the current cache line and the another cache line are stored in a direct-swap manner such that at a given time only one of the current cache line and the another cache line can be stored in the near memory.

11. The system of claim 8, further comprising a system level cache controller (SLCC), wherein the SLCC is configured to track information regarding whether a cache line is guaranteed to be located in the near memory.

12. The system of claim 11, wherein the SLCC is further configured to track information regarding whether a cache line located in the far memory comprises all zeros.

13. The system of claim 8, wherein the requestor comprises a central processing unit (CPU) associated with the system, wherein the near memory comprises a first swappable range of memory addresses allocable to a process for execution by the CPU, wherein the far memory comprises a second swappable range of memory addresses allocable to the process for execution by the CPU, and wherein a ratio of a size of the first swappable range of memory addresses associated with the near memory and a size of the second swappable range of memory addresses associated with the far memory is fixed.

14. The system of claim 8, wherein the near memory controller is further configured to provide grounded bits associated with a data portion as synthesized data portion.

15. A method for managing a system having a system level cache, a near memory, and a far memory, wherein cache lines associated with the system level cache can be swapped between the near memory and the far memory, the method comprising:
   receiving a write request from a requestor to write non-zero data corresponding to an address;
   upon determining that a current cache line stored at the address in the near memory is not guaranteed to be in the system level cache, prior to writing the non-zero data, initiating a read request to read another cache line stored at the address in the near memory; and
   upon determining that a data portion associated with the another cache line comprises all zeros, writing the non-zero data corresponding to the address in the near memory, and modifying a metadata portion associated with the another cache line stored at the address in the near memory to indicate that the data portion associated with the another cache line does not contain all zeros.

16. The method of claim 15, wherein the writing the non-zero data corresponding to the address in the near memory results in a completion of the write request and there is no further interaction with the far memory in response to the write request.

17. The method of claim 15, wherein the current cache line and the another cache line are stored in a direct-swap manner such that at a given time only one of the current cache line and the another cache line can be stored in the near memory.

18. The method of claim 15, wherein the system further comprises a system level cache controller (SLCC), and wherein the method further comprises the SLCC tracking information regarding whether a cache line is guaranteed to be located in the near memory.

19. The method of claim 18, further comprising the SLCC tracking information regarding whether a cache line located in the far memory comprises all zeros.

20. The method of claim 15, wherein the requestor comprises a central processing unit (CPU) associated with the system, wherein the near memory comprises a first swappable range of memory addresses allocable to a process for execution by the CPU, wherein the far memory comprises a second swappable range of memory addresses allocable to the process for execution by the CPU, and wherein a ratio of a size of the first swappable range of memory addresses associated with the near memory and a size of the second swappable range of memory addresses associated with the far memory is fixed.

* * * * *